(12) United States Patent
Krah

(10) Patent No.: US 8,203,300 B2
(45) Date of Patent: Jun. 19, 2012

(54) CLOSED-LOOP CONTROL METHOD AND CLOSED-LOOP CONTROL DEVICE WITH MULTI-CHANNEL FEEDBACK

(75) Inventor: Jens Onno Krah, Wuppertal (DE)

(73) Assignee: Beckhoff Automation GmbH, Verl (DE)

( * ) Notice: Subject to any disclaimer, the term of this patent is extended or adjusted under 35 U.S.C. 154(b) by 265 days.

(21) Appl. No.: 12/685,115

(22) Filed: Jan. 11, 2010

(65) Prior Publication Data

US 2010/0141198 A1    Jun. 10, 2010

Related U.S. Application Data

(63) Continuation of application No. PCT/EP2008/058948, filed on Jul. 9, 2008.

(30) Foreign Application Priority Data

Jul. 12, 2007 (DE) .................. 10 2007 032 484

(51) Int. Cl.
*G05B 21/02* (2006.01)
(52) U.S. Cl. .................. 318/636; 318/634; 318/671
(58) Field of Classification Search .................. 318/636, 318/634, 671, 685, 652; 700/32; 360/78.13
See application file for complete search history.

(56) References Cited

U.S. PATENT DOCUMENTS

| | | | |
|---|---|---|---|
| 2003/0214448 A1* | 11/2003 | Downs | 343/757 |
| 2006/0022657 A1 | 2/2006 | Sutardja | |
| 2008/0234841 A1* | 9/2008 | Chen et al. | 700/45 |

FOREIGN PATENT DOCUMENTS

| | | |
|---|---|---|
| DE | 4000663 | 6/1991 |
| DE | 19614866 | 10/1997 |
| DE | 19961798 | 8/2001 |
| DE | 10063895 | 7/2002 |
| DE | 10226974 | 1/2004 |
| DE | 10253739 | 5/2004 |
| DE | 102005023453 | 11/2006 |
| JP | 09/182493 | 7/1997 |
| JP | 2005-204440 | 7/2005 |
| WO | WO 20050111402 | 11/2005 |

* cited by examiner

*Primary Examiner* — Karen Masih
(74) *Attorney, Agent, or Firm* — Dorsey & Whitney LLP

(57) ABSTRACT

A method of closed-loop controlling determines a first feedback variable by sampling a control variable and a second feedback variable by averaging the control variable, compares the first and second feedback variables with a command variable, and sets the control variable on the basis of the comparing result so that the control variable follows a command variable.

30 Claims, 10 Drawing Sheets

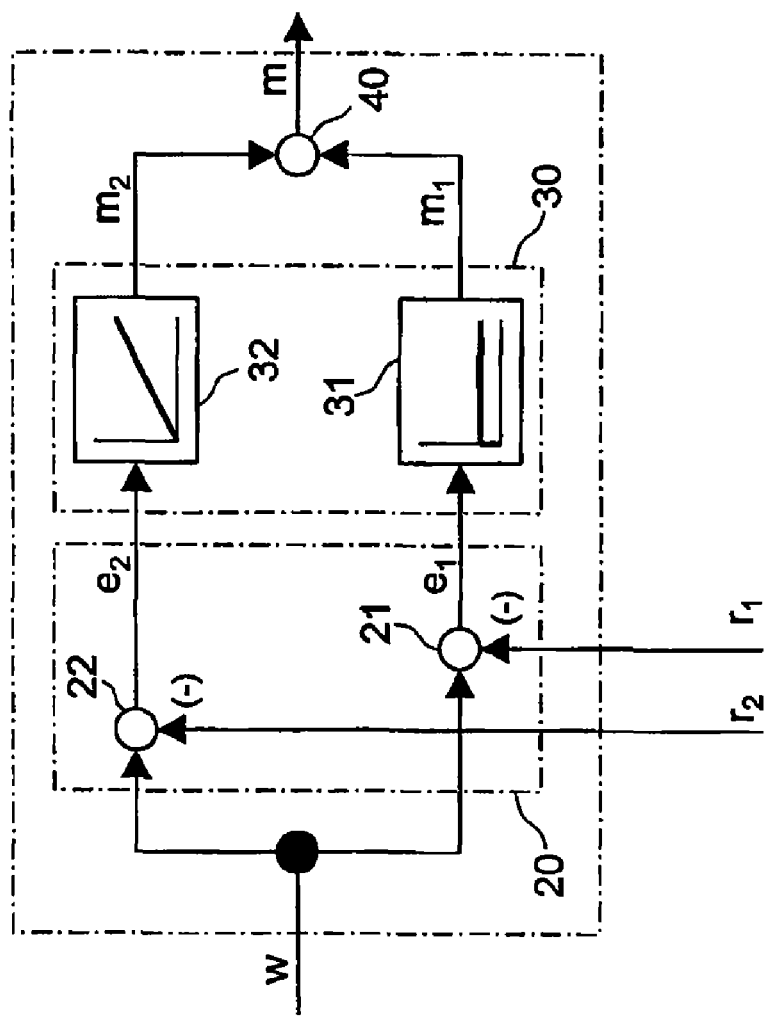

CLOSED-LOOP CONTROL METHOD AND CLOSED-LOOP CONTROL DEVICE WITH MULTI-CHANNEL FEEDBACK

This application is a Continuation of PCT Patent Application No. PCT/EP2008/058948 filed Jul. 9, 2008, entitled "Closed-Loop Control Method and Closed-Loop Control Device with multi-Channel Feedback," which claims priority to German Patent Application No. 10 2007 032 484.9 filed Jul. 12, 2007. The entire content of both applications is hereby incorporated by reference.

FIELD

The present invention generally relates to a method of closed-loop controlling, to a closed-loop controller and a current controller, being in particular used for controlling inductive loads such as servomotors.

BACKGROUND

Closed-loop control is usually characterized by a two-channel or, respectively, a multi-channel evaluation of the control variable by means of which a rapid and accurate closed-loop control may be implemented. The closed-loop control which is preferably implemented by means of pulse-width modulation comprises a high parasitic signal suppression and at the same time a high band-width.

Many technical processes require a control variable to be maintained on a set value predetermined by a command variable. For this, closed-loop control systems are used in which the control variable is continuously measured and compared with the command variable and, depending on this comparison, adapted by means of correspondingly setting a manipulated variable in terms of an equalization to the command variable. The sequence of actions resulting from this takes place in a closed-loop control system. Depending on the particular application, various physical variables such as pressure, temperature, engine speed, velocity, voltage, current intensity etc. come into consideration. Therein, the components which are characteristic for a closed-loop control system and necessary for the sequence of actions, such as measuring device, comparing device, control device or actuator unit, may turn out to be very different depending on the application. Except for a few exemptions, modern closed-loop control systems are almost exclusively implemented by circuit technique. This is in particular the case for rather complex closed-loop control systems. The spectrum of those closed-loop control systems reaches from basic analog control circuits to digital controllers. Apart from a solution by means of circuit technique, a digital closed-loop control algorithm may also be implemented in the form of a program which runs on a microprocessor or in a field programmable gate array (FPGA). Due to the digital signal processing and the modifiability connected therewith, the digital controller is particularly applicable for rather complex closed-loop control requirements in which a particularly high accuracy and parameters which are reproducible in an accurate manner are essential.

It may be distinguished among other things between continuous controllers and sampling controllers. An analog controller is a typical continuous controller. Since the analog control algorithm may react to changes in the input variable with virtually no time lag and since it may put a corresponding output variable on its output, input and output variables of this type of controller typically consist of continuous signals. In contrast to this, a digital controller is a sampling controller. Its transfer function is implemented by means of a series of arithmetic operations which is carried out successively. Due to the computing time needed in the digital control algorithm, a time lag occurs between measuring the input variable and outputting the output variable. The control variable is not measured continuously but only at certain sampling moments since during the implementation of the control algorithm, the input variable is typically not measured and computed anew. Consequently, digital sampling provides discontinuous time-discrete signals, wherein the signal variable is provided only at discrete points in time. The time between two subsequent sampling moments (cycle time $T_A$) determines the sampling rate or rather the sampling frequency $f_A$. In order to be able to also measure higher-frequent signal parts of the control variable, a high sampling rate is necessary. The upper limit of the sampling rate which is characteristic for a digital controller is predominantly determined by the computing time needed for the computing algorithm. It thus depends on the computing velocity of the used microprocessor, microcontroller or the FPGA, respectively.

For implementing a control system, controllers are required which comprise a control behavior specific to the corresponding application. Therefore, there is a range of simple control elements, the characteristic control properties of which may be described by means of fundamental transfer functions, respectively. By combining several of those control elements, more complex controllers may be constructed, the control behavior of which may be better adapted to the requirements of the corresponding application.

The PI-controller, for example, is a typical controller combination. This type of controller comprises a proportional controller and an integral controller switched in parallel to the proportional controller. Whereas the proportional element multiplies the input value by a fixed factor, the integral element carries out a time integration of the control deviation which is capable of being parameterized. The relatively quick proportional controller therein is a good completion to the integral controller which is in particular responsive to longer-lasting control deviations. Since the PI-controller combines the control properties of its two components, it may react to changes in the control variable or the command variable rather rapidly and it may also lead small static control deviations steady-stately towards zero. A control behavior of this kind is desirable in many technical applications, which is one of the reasons for this controller type being widely spread.

The current control of electric drives is a very important field of application of the PI-controller. Such drives comprise an electric motor as a central component, the electric motor acting as an energy converter, converting the electrical energy supplied to it into mechanical energy. A rotatory motor provides the mechanical energy in form of a rotary motion on a motor shaft, whereas a linear motor provides the mechanical energy as a translation to a movable carriage. Therein, depending on the supplied electrical energy, a certain torque or a certain force, respectively, occurs on the motor shaft or on the motor carriage, respectively, whereupon the motor shaft or the motor carriage, respectively, carries out a motion depending on the effective counter forces. In order to control this motion, the electric drive comprises a current-control device which forms a central closed-loop control system of a drive control. By means of the current-control device which is preferably based on a PI-controller, the current flowing through the motor winding and thus the mechanical energy delivered by the electric motor are directly influenced. In order to portion the electric energy supplied to the electric motor, an actuator unit is used. By means of this actuator unit it is possible to set the forces acting upon the motor shaft or on the motor carriage, respectively, according to the requirement of the PI-controller. Actuator units of modern electric drives use power semiconductors such as power transistors by means of which the supply of electric energy to the motor may be switched on and off.

Position-controlled drives and in particular servo-drives which are used in industrial manufacturing require a very precise current control in order to be able to precisely control the torque or respectively the force and the motion of the servo-motor resulting therefrom. A rapid and precise current control is furthermore required for a high stiffness of the drive and high closed-loop gains of a superimposed rotation-speed control loop. By means of a precise current-control, feed-forward systems may also be efficiently used. Potentially occurring current or torque errors then do not have to be compensated by the slower rotation-speed controller.

The rapid and accurate measuring of the actual value is an exceedingly important property of the closed-loop control system since for a rapid reaction of the closed-loop control system to variations in the control variable the exact knowledge of the effective actual value is necessary. The actual value of the control variable may in principle be measured by different measuring methods, whereby the individual measuring methods partially differ considerably with regard to their accuracy and rapidity. Apart from the continuous measuring of control variables which is in particular characteristic for analog controllers, the control variable may also be measured discontinuously by means of a sampling method. It is common practice in particular for digital controllers to sample the control variable at a sampling frequency which is predetermined by the work cycle of the controller.

In sampling the control variable, however, the sampling theorem has to be taken into account in order to avoid potential measuring errors by higher-frequent parts of the measuring signal. There are several possibilities for this. The control variable may for example be band-limited by means of an anti-aliasing low-pass filter. Herein, high-frequent parts of the measuring signal are filtered out. However, due to the phase shift associated with it, this method is not suitable for all applications. The higher-frequent parts furthermore may be suppressed over a suitable period of time by averaging the measured values. In particular in a control method operating by means of a pulse modulation such as a pulse-width modulation (PWM), a switching period of the pulse modulation may be a suitable period of time. However, the additional downtime in conjunction with the generation of the average value also results in an undesirable phase shift. Eventually, the control variable in a closed-loop control method using a pulse modulation for setting the control variable may also be sampled synchronously with the pulse modulation. This measuring method, however, depends on the existence and on the knowledge of certain harmonic-free points in time of the control variable which renders it very vulnerable to disturbance.

SUMMARY

The present invention generally relates to a method of closed-loop controlling, a closed-loop controller and a closed-loop control system.

According to an embodiment of the invention, a method of closed-loop controlling determines a first feedback variable by sampling a control variable and a second feedback variable by averaging the control variable. Then the first and second feedback variables are compared with a command variable and a the control variable is set on the basis of the comparing result so that the control variable follows a command variable.

According to a further embodiment of the invention, a method of closed-loop controlling determines a first feedback variable by sampling a control variable at a sampling rate, the actual value of the control variable being registered, respectively, at a point in time which is determined by the sampling rate, the actual value being provided as a first feedback variable. Then, a first control deviation by comparing the first feedback variable with a command variable is determined and a first individual controller output variable is generated from the first control deviation by means of a first controller. The method of closed-loop controlling further determines a second feedback variable by averaging the control variable, the actual value of the control variable being registered over a period of time, whereby an average value is generated from the actual value, and whereby the averaged actual value is provided as a second feedback variable. Then a second control deviation by comparing the second feedback variable with the command variable is determined and a second individual controller output variable from the second control deviation by means of a second controller is generated. The method of closed-loop controlling further generates a controller output variable from the two individual controller output variables and uses the controller output variable for setting the control variable so that the control variable follows the command variable.

According to a further embodiment of the invention, a closed-loop controller comprises a measuring device being configured to determine a first feedback variable by sampling a control variable and a second feedback variable by averaging the control variable, a controller being configured to generate a controller output variable by means of a comparison of the first and second feedback variables with a command variable, and an actuator unit for setting the control variable by means of the controller output variable in such a way that the control variable follows the command variable.

According to a further embodiment of the invention, a closed-loop controller comprises a measuring device, wherein the measuring device is configured to determine a first feedback variable by sampling the control variable, the actual value of the control variable being registered each time at a point in time which is determined by the sampling frequency and the actual value of the control variable then being provided as a first feedback variable, wherein the measuring device is further configured to determine a second feedback variable by averaging the control variable, the actual value of the control variable being determined and averaged over a period of time and the averaged actual value being provided as a second feedback variable. The closed-loop controller further comprises a comparing device having a first and a second comparing element, wherein the first comparing element is configured to generate a first control deviation by means of a comparison of the first feedback variable with a command variable, and wherein the second comparing element is configured to generate a second control deviation by means of a comparison of the second feedback variable with the command variable. The closed-loop controller further comprises a first and a second controller, wherein the first controller is configured to generate a first individual controller output variable from the first control deviation, and wherein the second controller is configured to generate a second individual controller output variable from the second control deviation. The closed-loop controller further comprises a summation device, wherein the summation device is configured to generate a controller output variable from the two individual controller output variables. The closed-loop controller further comprises an actuator unit for setting the control variable by means of the controller output variable in such a way that the control variable follows the command variable.

According to a further embodiment of the invention, a current controller for a load, comprises a measuring device being configured to determine a first feedback variable and a second feedback variable from a control variable, a controller being configured to generate a controller output variable by means of a comparison of the first and second feedback variables with a command variable and an actuator unit for setting the control variable by means of the controller output variable in such a way that the control variable follows the command variable.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 6A shows a block diagram of a new current controller having a two-channel current feedback.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Also, signal names used below are exemplary names, indicative of signals used to perform various functions in a given memory device. In some cases, the relative signals may vary from device to device. Furthermore, the circuits and devices described below and depicted in the figures are merely exemplary of embodiments of the invention. As recognized by those of ordinary skill in the art, embodiments of the invention may be utilized with any memory device.

Figure 1:
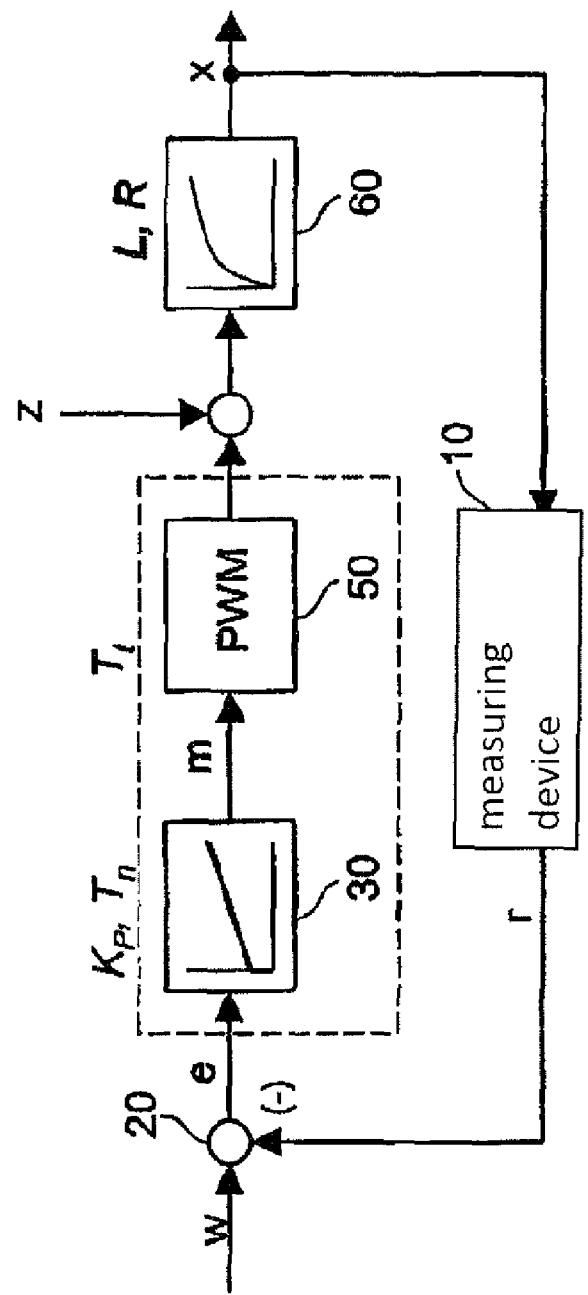
FIG. 1 shows a block diagram of a control loop for current controlling of a load by means of a PI-controller and a pulse-width modulation.

Embodiments of the invention will be explained in more detail in conjunction with an electric motor. However, the invention may generally be used with any type of controller FIG. 1 shows the closed sequence of action of a typical current-control device. Therein, the current i of a load, in particular of an inductive load such as an electric motor is controlled as the control variable x. The closed-loop control system 1 comprises several components interacting with each other which form a closed control loop. A set value for the current $x_{soll}$ which is provided for example by a superordinate rotation-speed control loop 2 serves as command variable w of the current-control device 1. A comparing element 20 which forms the input area of the closed-loop control system 1 compares the set value for the current $x_{soll}$ with an actual value of the current $x_{ist}$ of the current x flowing through the motor winding. The actual value of the current $x_{ist}$ is determined by means of a measuring device 10 and is then made available to the comparing element 20 as feedback variable r via a feedback channel. The control deviation e generated by the comparing element 20 is made available to a closed-loop control device 30 which by means of its transfer function generates a controller output variable m from the control deviation e. The controller output variable m serves for controlling an actuator unit 50. As a general rule, a PI-controller is used as a current controller 30, the controlling behavior of the PI-controller being adapted to the respective application. The PI-controller 30 comprises a proportional controller (proportional element with proportional action coefficient $K_P$) and an integral controller (integral (I-) element with integral action coefficient $K_I = K_P/T_n$ and reset time $T_n$) acting in parallel to the proportional controller. Therein, each of the two individual controllers generates a distinct individual controller output variable from the input variable e applied to its input. Then, the two individual controller output variables are summed up to form a common controller output variable m which is fed into an actuator unit 50. The actuator unit 50 in the present case comprises a pulse-width modulator in order to convert the value for the motor voltage predetermined by the controller output variable m into a pulse-width modulated actuating signal. The actuating signal serves for controlling power switches of an actuator, thus achieving that the voltage applied to the motor winding is clocked. The motor current x resulting therefrom is smoothed by the integrating effect of the motor winding L. As is depicted in the block diagram of FIG. 1, different disturbance variables z may act upon the control path and thus may negatively influence the control variable current x.

Figure 2:
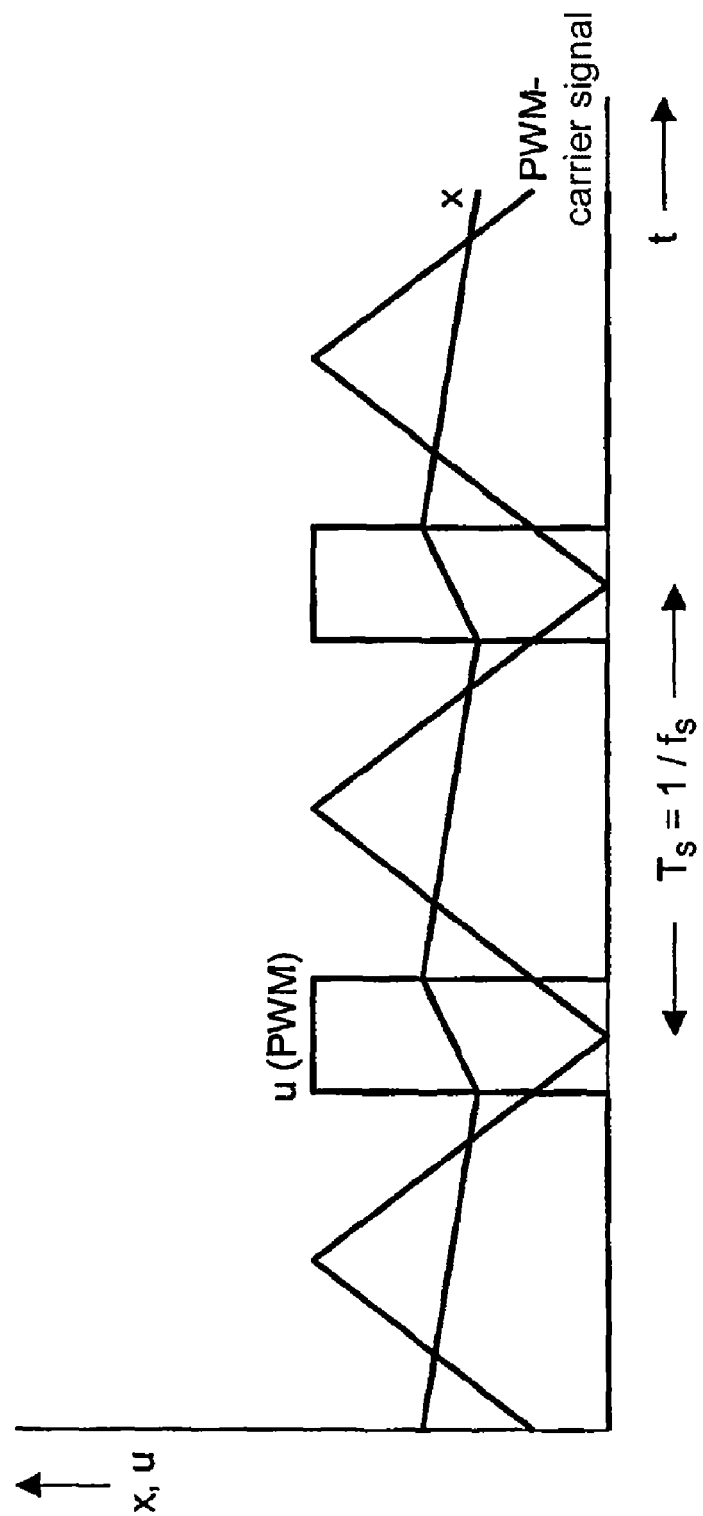
FIG. 2 depicts a temporal voltage-/current curve of a current control implemented by means of pulse-width modulation.

FIG. 2 shows the principle voltage and current curve of an electric motor during a pulse-width modulation (PWM). The motor voltage or coil voltage, respectively, is therein predetermined in a time-discrete form by the pulse-width modulation. It is characteristic for this control method that the width of the individual PWM-pulses correlates directly with the time development of the input values of the pulse-width modulator and that the voltage change takes place in the pattern of a time interval $T_S$ which is predetermined by a switching frequency $f_S$ of the pulse-width modulation. The control voltage which is thus generated comprises a virtually rectangular curve having only two voltage levels. The pulse-width modulated voltage typically comprises very steep edges in order to minimize potential switching losses. The desired fundamental wave of the control voltage results from rapidly switching between the two voltage stages. Pulse-width modulation in general uses constant frequencies, such as 4 kHz, 8 kHz or 16 kHz. In the present case, a triangular voltage serves as PWM carrier signal. Due to the smoothing effect of the motor winding L, the coil current x follows the coil voltage only very slowly. A saw-tooth current curve results from this, the coil current oscillating back and forth around the average value at the switching frequency $T_S$ of the pulse-width modulation. The oscillating motion of the coil current acting as harmonic of the coil current x may lead to a considerable falsification of the sampling measurement due to potential aliasing effects. A faulty measurement ultimately results in a worse control behavior, in particular with regard to accuracy, of the current control circuit 1 and thus also of the superordinated rotation-speed control loop 2.

In order to avoid these sampling errors and to thus optimize the control behavior of the control loop, the sampling theorem must be considered. This may be achieved by means of various measuring methods.

Figure 3:
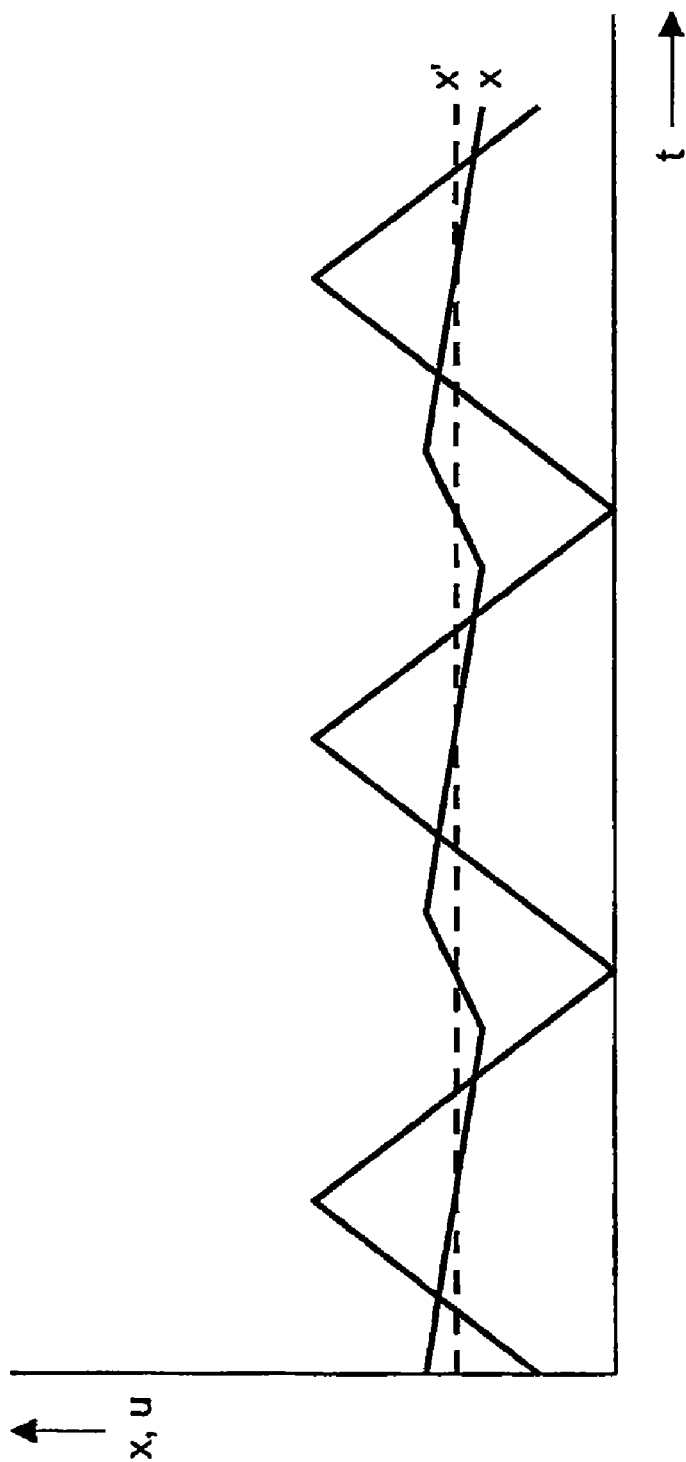
FIG. 3 depicts a temporal voltage-/current curve of a current measurement by means of an anti-aliasing low-pass filter.

The higher-frequent parts of the coil current may be eliminated by using a suitable anti-aliasing low-pass filter. This results in a curve for the filtered coil current x' which is shown in FIG. 3. This curve basically corresponds to the average value of the unfiltered coil current x. However, the use of the first-order anti-aliasing low-pass filter causes a phase shift of up to 90°, considerably decreasing the phase margin of the control loop and thus also the maximal possible closed-loop gain. This renders this measuring method less suitable, in particular for industrial use.

Figure 4:
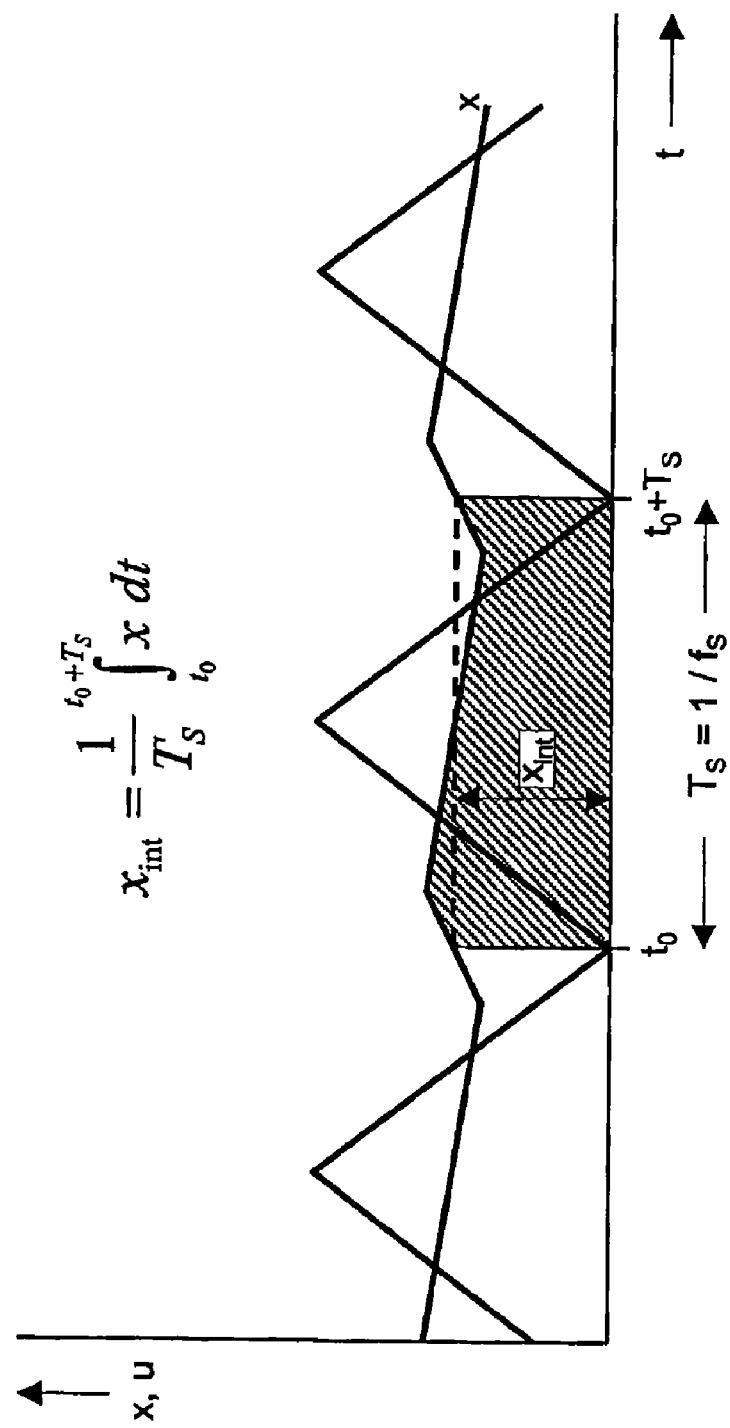
FIG. 4 shows a temporal voltage-/current curve of a current measurement by integration over a period of the switching frequency.

Generating an average value is another measuring method for accurately measuring the actual value $x_{ist}$ of the control variable current x. In this method which is e.g. also used in digital multimeters, the measured value x is registered over a suitable period of time and an average value is generated from the registered measured values. Registering the measured value may be carried out continuously as well as by means of rapid sampling. When using pulse-width modulation, a PWM-switching period $T_S$ particularly comes into consideration as a suitable period of time. Such a generation of an average value over a switching period $T_S$ is depicted in FIG. 4. Since the timely development of the current intensity x of the servomotor may be described by means of a continuous function, the determination of an average value of the actual value of the current $x_{ist}$ may be carried out by an integration over a PWM period $T_S$:

$$x_{int} = \frac{1}{T_S} \int_{t_0}^{t_0+T_S} x \, dt$$

As is shown in FIG. 4, the area generated underneath the current curve by integration is proportional to the average actual value of the current $x_{int}$ in the PWM period $T_S$. In order to obtain the positive average actual value of the current $x_{int}$ in the time interval $T_S$, the area integral is divided by the integration time $T_S$.

It is advantageous to generate the integral over a time interval which complies with the PWM period $T_S$ predetermined by the clock signal of the pulse-width modulation. The integration, however, does not compellingly have to be carried out exactly between the points in time $t_1$, $t_2$, $t_3$, $t_4$ predetermined by the clock signal, but it may also be carried out with a time shift. As is shown in FIG. 4, the upper and lower deflections of the current signal cancel each other due to the integration over a complete PWM period in the ideal case. The integral determined hereby then expresses in a very good approximation the respective average actual value of the current. However, it is not compellingly necessary that generating the average value takes place over a complete PWM period. For example, a longer period of time (such as a multiple of the PWM period) may also be chosen as integration period. A period of time shorter than a PWM period is also generally possible. However, deviations from the determined average value from the positive average value may then occur since in this case the deflections of the current signal induced by the harmonic do not completely cancel each other. Potential deviations from the actual average value may, however, be taken into consideration by means of a corresponding amendment if necessary.

Since the variations of the measured signal induced by the higher-frequent parts typically cancel each other during the generation of an average value, this measuring method is particularly insusceptible towards disturbances which are for example caused by switching processes or by EMC (electromagnetic compatibility). Therefore, integral measuring which is basically applicable for all pulse-modulation methods is very suitable for the application in industrial use, in particular if an accurate controlling is required.

However, an additional downtime $T_T=T_S/2=T_A$ must also be considered in generating an average value. This is a disadvantage with regard to the measurement of the actual value in a control loop since the phase shift $\phi=\omega \cdot T_T$ caused by the additional downtime $T_T$ here as well decreases the phase margin of the control loop and thus the maximal possible closed-loop gain.

Figure 5:
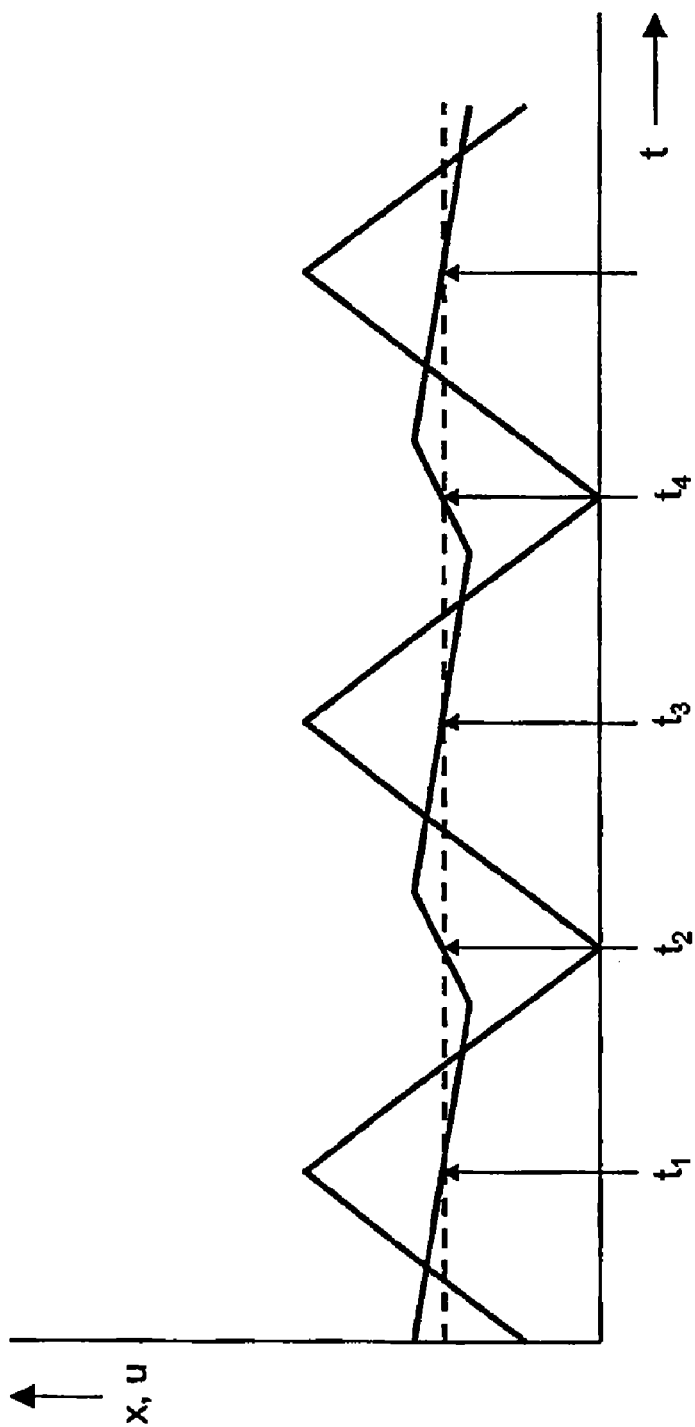
FIG. 5 shows a temporal voltage-/current curve of a current measurement by means of synchronously sampling the current progress at certain harmonic-free points in time.

Sampling the control variable x at certain points in time $t_1$, $t_2$, $t_3$, $t_4$, however, is a particularly rapid possibility of measuring the actual value of the current $x_{ist}$. In order to prevent the measurement from being too falsified by the higher-frequent parts of the control variable x, such points in time $t_1$, $t_2$, $t_3$, $t_4$ in which the control variable basically corresponds to the average value are preferably chosen for sampling. For this, it is required, however, that such harmonic-free points in time $t_1$, $t_2$, $t_3$, $t_4$ actually exist. Beyond that they also have to be known. This is for example the case in current control methods which use a clocked voltage (e.g. by pulse modulation) for controlling the current. As is shown in FIG. 5, exactly two harmonic-free points in time $t_1$, $t_2$, $t_3$, $t_4$ as a rule occur during a PWM-switching period $T_S$ due to the oscillation of the motor current x caused by clocking the control voltage. The position within the time frame predetermined by the PWM-switching period $T_S$ in which these points in time lie may depend on the respective method with which the control voltage is clocked. Provided that all sampling moments are in a fixed time relationship with the PWM clock signal, sampling may be carried out at a sampling frequency $f_A=1/T_A$ which correlates with the PWM clock signal. When using pulse-width modulation for controlling the motor current x, the harmonic-free points in time basically comply with the points in time $t_1$, $t_2$, $t_3$, $t_4$ predetermined by the PWM clock signal.

Therefore, the control variable x may in such a case be sampled synchronously with the PWM clock signal, i.e. at the respective points in time at which the triangular PWM carrier signal comprises a stationary point. Therein, the sampling frequency is preferably the double switching frequency $f_S$:

$$f_A = 2 \cdot f_S$$

A higher sampling rate does generally not make sense. Herein, the pulse-width modulation would have to switch more rapidly which is, however, technically not desirable or not possible, respectively. A lower sampling rate also does not make much sense since closed-loop controlling would then take place in an unnecessarily slow manner.

The sampling measurement of the control variable x is basically a very rapid measuring method. It is therefore particularly suitable for rapid closed-loop controlling, especially as no additional downtime limits the bandwidth of the control loop. For this reason, this measuring method is often applied in industrial use. However, high-frequent disturbances or inaccurate sampling may considerably influence the result of measurement. Furthermore, this method requires a suitable PWM method or another suitable pulse-modulation method for the motor current in which the harmonic-free points in time are known or can at least be estimated.

In the following, it will be shown how by means of combining various measuring methods as well as by means of the two-channel or respectively multi-channel feedback of the feedback variables generated therein, a closed-loop control may be implemented which combines the advantages of the used measuring methods without their disadvantages. For this, the combined closed-loop controller is split up into its individual controllers which respectively obtain their own control deviation as input variable, but generate a common controller output variable.

FIG. 6A shows a block diagram of a partial area of the inventive current control loop 1 having a comparing device 20 comprising two comparing elements 21, 22, a control device 30, preferably comprising a PI-controller and a summation device 40. Thereby, the PI-controller is split up into a P-controlling element 31 and an I-controlling element 32 switched in parallel, a first comparing element 21 being assigned to the P-control element 31 and a second comparing element 22 being assigned to the I-control element 32. Each of the two comparing elements 21, 22 comprises its own feedback channel via which the corresponding comparing element 21, 22 receives a feedback variable $r_1$, $r_2$ from a measuring device 10. Two different actual values of the current which have been determined by means of various measuring methods serve as feedback variables $r_1$, $r_2$. In principle, each suitable measuring method may be used for determining the actual value of the current. Apart from measuring the control current directly, it may alternatively also be deduced from certain parameters. The two measuring methods are preferably chosen such that the actual values determined by them are optimized for the corresponding type of controller. Each of the two comparing elements 21, 22 compares the feedback variable $r_1$, $r_2$ assigned to it with the command variable w applied to a common input and, as result of this comparison, outputs a control deviation $e_1$, $e_2$ to the control element 31, 32 respectively assigned to it. By means of their corresponding transfer functions, the two control elements 31, 32 respectively generate an individual controller output variable $m_1$, $m_2$ from the control deviations $e_1$, $e_2$ fed to them. Subsequently, the individual controller output variables $m_1$, $m_2$ are forwarded to a common summation device 40 which generates a controller output variable m from them. In general, the controller output variable m is therein generated by a simple addition of the two individual controller output variables $m_1$, $m_2$. However, for generating the combined controller output variable m from the two controller output variables $m_1$, $m_2$, any other operations may also be carried out, such as weighting the individual controller output variables $m_1$, $m_2$ with various factors. The combined controller output variable m of the control device 30 then serves as input variable for an actuator unit 50 for setting the control variable x.

Figure 6B:
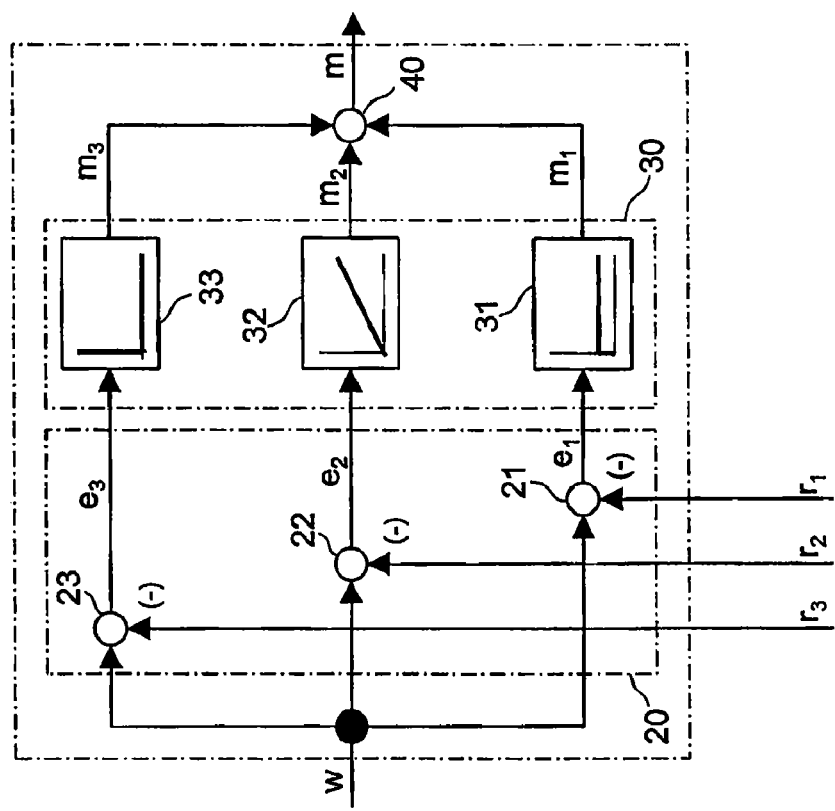
FIG. 6B depicts a block diagram of a new current controller having a three-channel current feedback.

The control device 30 shown in FIG. 6A may in principle also comprise other control elements. For example, a third control element 33 (such as a differential (D-) element having a derivative action coefficient $K_D$ or, respectively, a rate time $T_V$) may be provided in parallel to the two control elements 31, 32. Therein, the additional control element 33 may use one of the already-existing control deviations $e_1$, $e_2$ as input variable. Furthermore, it is also possible to provide the additional control element 33 with its own input variable. This may, for instance, be carried out by means of an additional comparison element 23 comparing a third feedback variable $r_3$ with the command variable w. Therein, an actual value of the current determined by means of a third measuring method may serve as the further feedback variable $r_3$. The output variable of the third control element 33 may be fed to the common summation device 40 as a third individual controller output variable $m_3$, the summation device generating the controller output variable m from all three individual controller output variables $m_1$, $m_2$, $m_3$. A control device 30 of that kind is depicted in FIG. 6B.

The third feedback variable $r_3$ may also be chosen to be identical to zero. In this case, only the command variable w is differentiated by the control element 33. From this, an advantageous special case of the embodiment depicted in FIG. 6B results. Here, the closed control loop 1 may react to changes in the command variable w in a particularly rapid manner.

Figure 7:
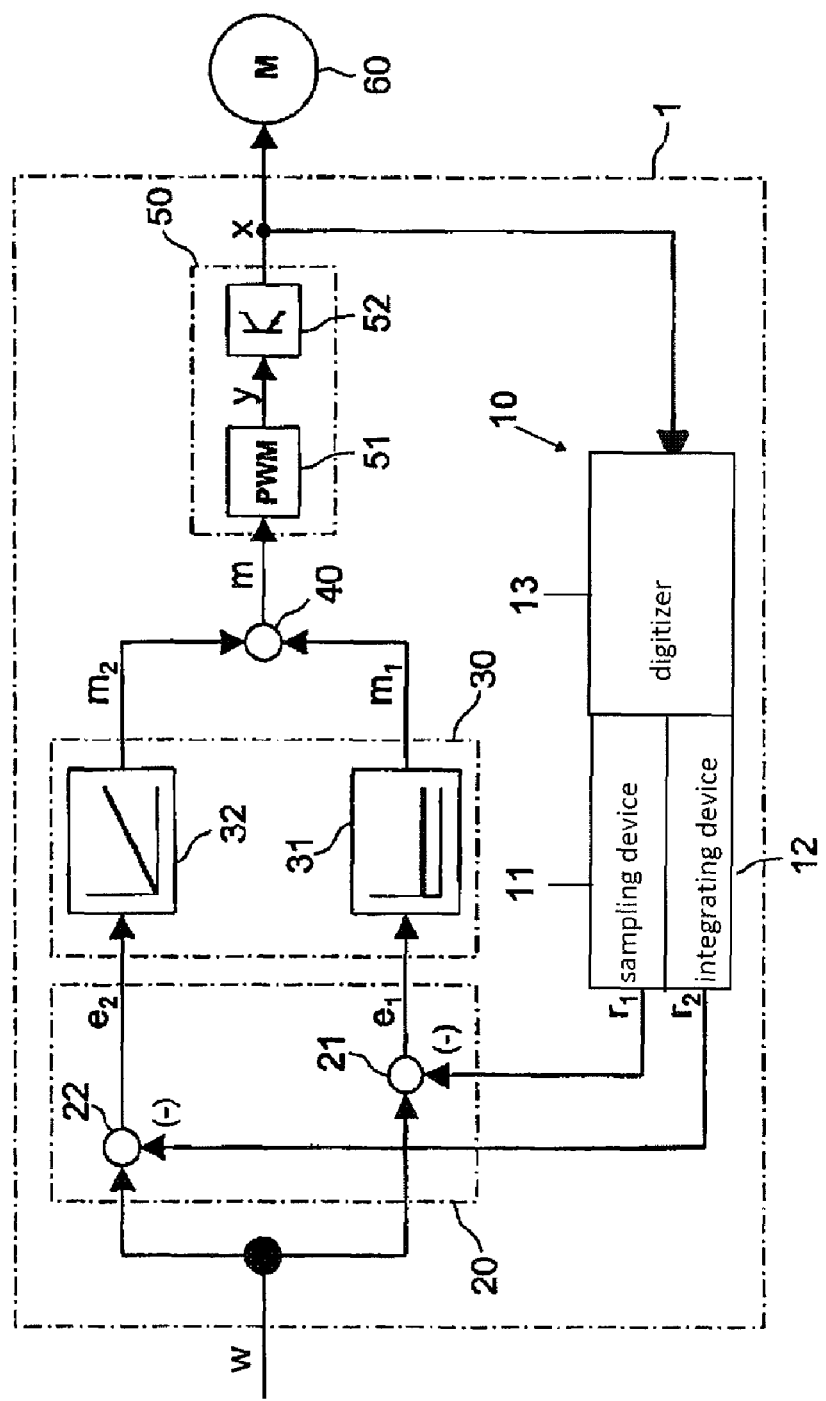
FIG. 7 shows a block diagram of a new current-control device for a servomotor.

FIG. 7 depicts a block diagram of an inventive closed-loop control device 1 comprising the control device 30 from FIG. 6A which comprises a two-channel feedback. The closed-loop control device 1 preferably configured for controlling the current of an electric motor further comprises a measuring device 10 by means of which the actual value of the control variable motor current is determined.

For this, the measuring device 10 samples the current x of the electric motor 60 at a suitable point of the control path. Therein, the measuring device 10 is configured to determine the actual value of the current $x_{ist}$ by means of two different measuring methods and to forward the measured results of the two measurements as a feedback variable $r_1$, $r_2$, respectively, to the comparing device 20 via the two separate feedback channels. For this, the measuring device 10 comprises two subunits which are herein schematically configured as a sampling device 11 and an integrating device 12. The sampling device 11 determines the first feedback variable $r_1$ by sampling the control variable x at a predetermined sampling frequency $f_A$. Herein, sampling preferably takes place synchronously with the pulse-width modulation by means of which the control voltage of a power output stage 52 for the motor current x is generated. Therein, the double PWM-switching frequency $f_S$ is preferably chosen as sampling frequency $f_A$. The integrating unit 12, however, determines the second feedback variable $r_2$ by generating an average value of the control variable x. This preferably takes place by integrating the control variable x via a PWM cycle $T_S$.

The algorithms for sampling and integrating the control variable x may be implemented both as two devices 11, 12 structurally separated from each other and as a common device of the measuring device 10. In a digital controller 1, all available analog signals, such as the control variable x, must furthermore be digitized before they can be further processed. For this, the measuring device 10 comprises a suitable digitizer 13. Preferably, digitizing the analog signals is carried out by means of sigma-delta (ΣΔ) modulators. In this case, the algorithm for sampling or, respectively, integrating the measured variable x may also be implemented in a cost-efficient manner in commercial programmable semi-conductor devices, such as an FPGA (field programmable gate array).

As has already been described above, the comparing device 20 generates two control deviations $e_1$, $e_2$ which are independent from each other from the two feedback variables $r_1$, $r_2$, the two control elements 31, 32 of the control device 30 generating the individual controller output variables $m_1$, $m_2$ from the control deviations $e_1$, $e_2$. By combining the individual controller output variables $m_1$, $m_2$ by means of the summation device 40, the controller output variable m is provided at the input of the actuator unit 50. The actuator unit 50 thereby comprises an actuating element 51 and an actuator 52. The actuating element 51 converts the value predetermined by the controller output variable m into a manipulated variable y for the actuator 52. In the present case, the digitally available controller output variable m is converted into a pulse-width modulated voltage signal y by means of a pulse-width modulator 51, the actuator 52 being controlled by the pulse-width modulated voltage signal y. The typical actuator 52 comprises power switches which are only operated at two characteristic points (locking or switched-through). The actuator 52 clocks the motor current x on the basis of the pulse-width modulated manipulated variable y.

The control device depicted in FIG. 7 directly controls the current flowing through the windings of the connected electric motor 60. In a multi-phase device, the motor current consists of several current components, respectively flowing through various windings of the motor. In the case of a three-phase motor, a rotating current or three-phase alternating current is used, the three current components $i_a$, $i_b$, $i_c$ of which that are in a predetermined phase and amplitude relationship towards each other being each set separately. Since all three three-phase alternating current components $i_a$, $i_b$, $i_c$ sum up to zero, each current component may be determined from the other two current components. Therefore, it is sufficient to measure and control only two current components $i_a$, $i_b$ of the three current components $i_a$, $i_b$, $i_c$. This allows for a facilitated three-phase current control having only two control loops which are independent from each other.

The closed-loop control may be further optimized by using a suitable coordinate system. According to the application (synchronous motor, asynchronous motor etc.), a stator fixed frame, a field-oriented coordinate system or a rotor coordinate system comes into consideration. The current components $i_a$, $i_b$, $i_c$ present in the originally stationary stator fixed frame, for example, may be depicted by a simple transformation as corresponding current components $i_\alpha$ and $i_\beta$ of an orthogonal α/β-coordinate system. By means of a coordinate rotator, controlling is also possible in a field-oriented d/q-coordinate system, in which the two current components $i_d$, $i_q$ are configured as two direct currents easy to control. Since the flow-generating current component $i_d$ does not contribute to the generation of a torque, the input variable of the corresponding control loop may be predetermined identical to zero in order to operate the device in an optimal way with respect to losses. In this case, the control value of a superimposed speed controller w is only applied at the input of the control loop which is responsible for the torque-generating current component $i_q$.

Figure 8:
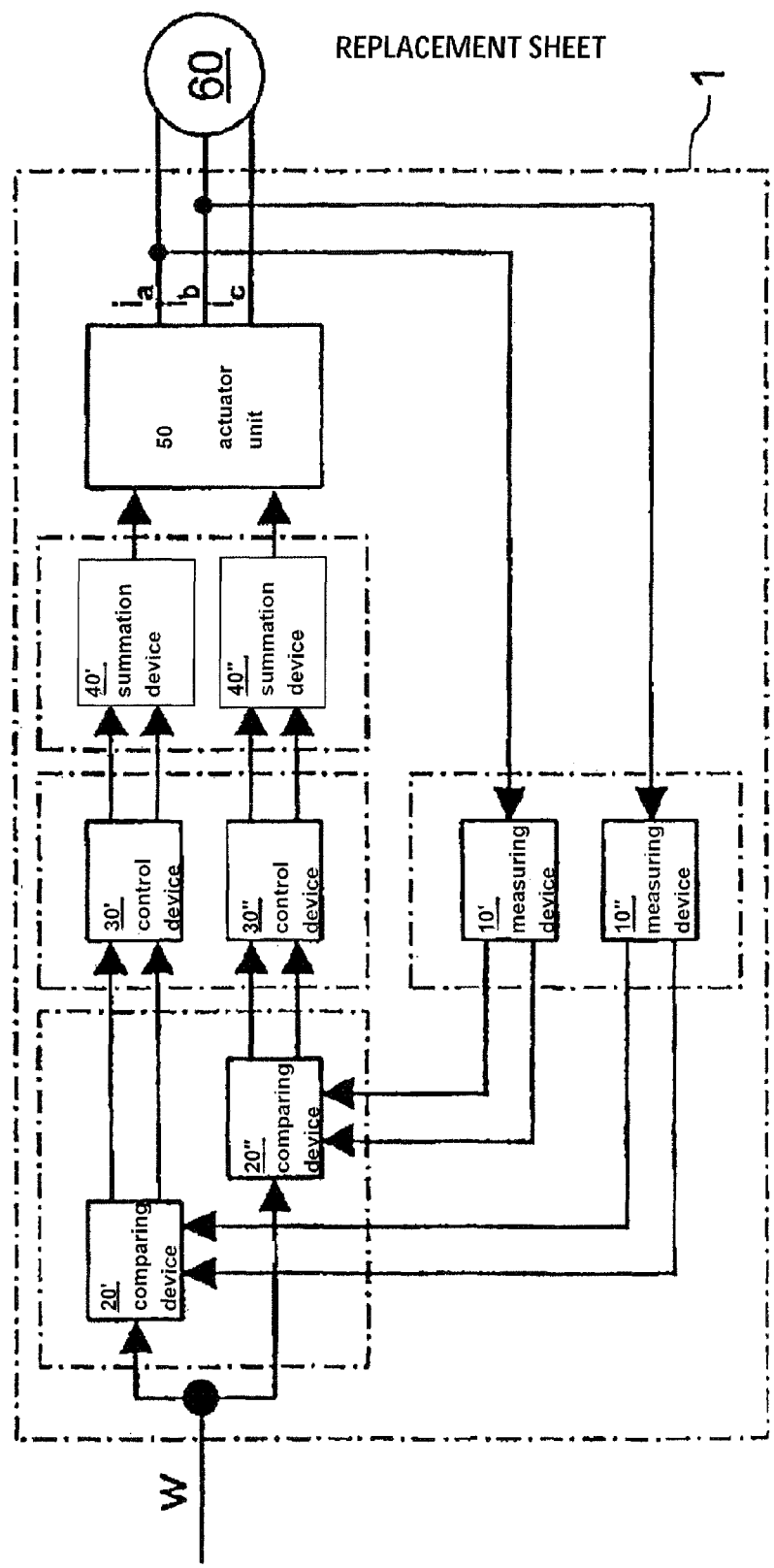
FIG. 8 shows a block diagram of a current controller for a three-phase motor in which two different current components are determined and controlled independently from each other.

FIG. 8 shows a corresponding current control device 1 for a three-phase motor 60. The control device 1 in the present example comprises two control loops which are independent from each other for the two current components $i_\alpha$, $i_\beta$ of the rectangular stator fixed frame. An individual measuring device 10', 10" and an individual control device 30', 30" is therein assigned to each current component $i_\alpha$, $i_\beta$. Each of the two measuring devices 10', 10" determines the current component $i_a$, $i_b$ assigned to it preferably by means of various measuring methods, such as a sampling measurement and an average-value measurement. The actual values of the current $i_{ist}$ determined therein are fed to a respective comparing device 20', 20". In FIG. 8, two feedback channels are for example provided for each measuring device 10', 10". In the associated control device 30', 30", several individual controllers generate a corresponding number of individual controller output variables on the basis of the output variables of a comparing device 20', 20", the individual controller output variables subsequently being combined to a controller output variable of the corresponding control loop by means of a summation device 40', 40". Eventually, by means of the controller output variables of the two control loops, an actuator unit 50 is controlled setting the individual three-phase voltage components $u_a$, $u_b$, $u_c$. Thereby, in this example, the controller output variables available in the rectangular α/β-coordinate system must be converted such that the actuator unit 50 sets the three three-phase voltage components $u_a$, $u_b$, $u_c$. In order to increase the accuracy of the closed-loop control, all three current components $i_a$, $i_b$, $i_c$ of the three-phase current may as well be measured directly. In this case, the closed-loop control device 1 preferably comprises three measuring devices, one for each phase, respectively (not depicted here). Controlling may in this case take place in a biaxial coordinate system as well.

In rotating devices, a controlling is often required by means of which the rotational speed may be maintained at a predetermined value. Controlling rotational speed in this way may be implemented for example by means of a control method known as cascade control in which a current control loop is subordinate to a rotation-speed control loop. Hereby, the auxiliary variable motor current is first of all controlled by means of a rapid, inner control loop, the command variable of which is generated by the control value of the outer, slower control loop (rotation-speed control loop). The entire control path is subdivided into smaller partial control paths by interlacing the two control loops in this manner, the smaller partial control paths being more clearly represented and better to be controlled than the entire control path. By this, a higher control accuracy may often be achieved.

Figure 9:
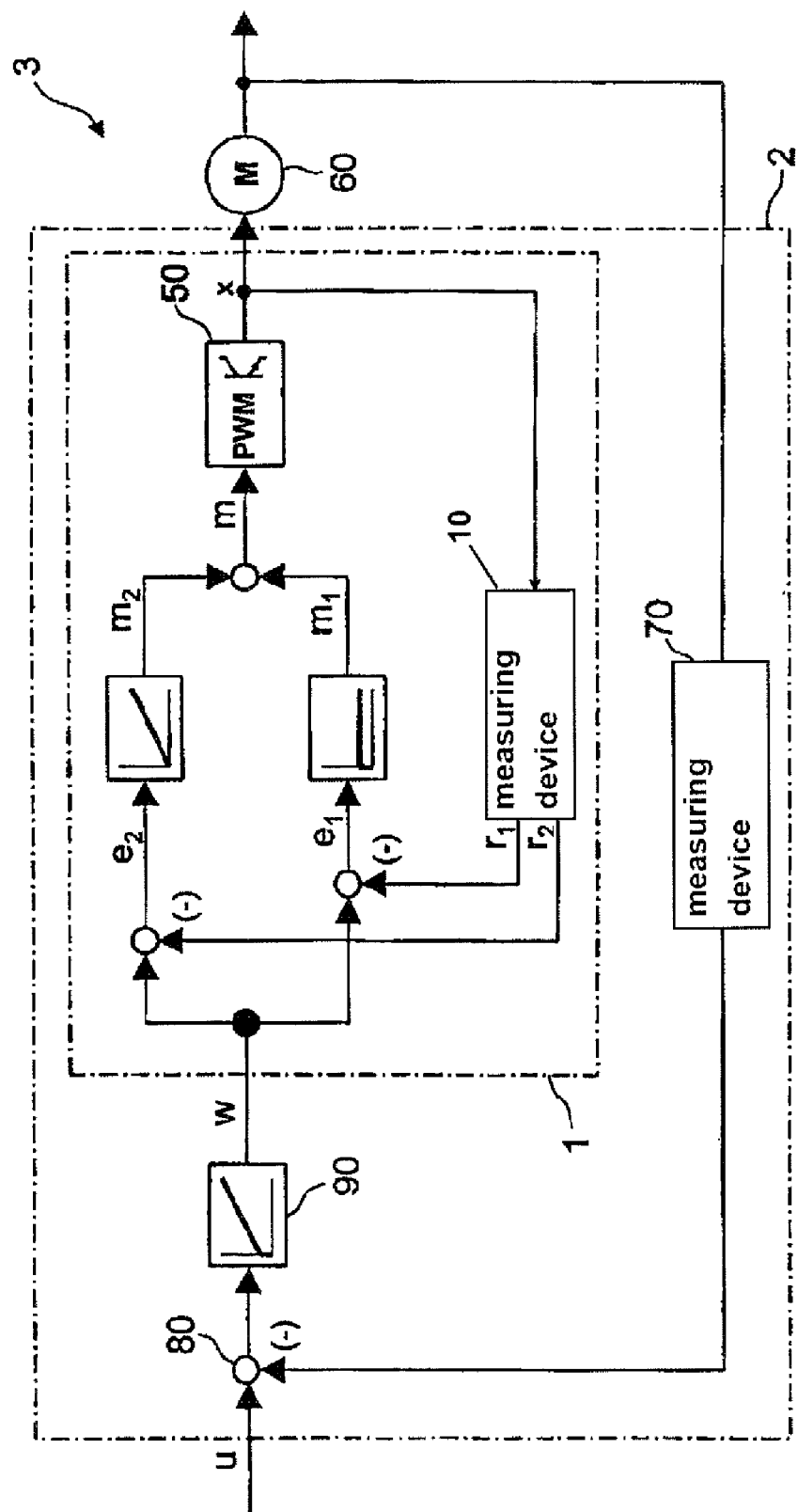
FIG. 9 depicts a block diagram of a closed-loop control system having a rotation-speed control device superimposed by the current control device.

FIG. 9 depicts a block diagram of such a rotation-speed control system 3 for a servomotor having the inventive current control device 1 as shown in FIG. 7 and a superimposed rotation-speed control device 2. Whereas the inner current control loop 1 measures the motor current as control variable x by means of its measuring device 10, the superimposed rotation-speed control loop 2 samples the rotation speed of the electric motor 60 in the drive chain by means of a corresponding measuring device 70. A comparing device 80 of the rotation-speed controller 2 generates a rotation-speed control deviation from a comparison of the actual value of the rotation speed determined by means of the measuring device 70 with a set value of the rotation speed predetermined by a command variable u. On the basis of this control deviation, a PI-controller 90 of the rotation-speed control loop generates a corresponding controller output control which is provided as command variable w to the current control loop 1. In case that a feed-forward system is additionally provided, the command variable w of the current control loop 1 may also be generated by combining the controller output variable of the rotation-speed control loop 2 with a feed-forward variable.

The rotation-speed control loop 2 shown in FIG. 9 may also be configured as an inner control loop of a superordinate control device. In particular, position-controlled drives such as servo-drives comprise another position-control loop (not shown here) superordinate to the rotation-speed controller 3, the output variable of the position-controller generating the command variable u of the rotation-speed controller 3.

According to an embodiment of the invention, a method of closed-loop controlling is provided in which a first feedback variable is determined by sampling a control variable at a certain sampling frequency, the actual value of the control variable being respectively registered at a point in time which is predetermined by the sampling frequency and being provided as a first feedback variable. Subsequently, a first control deviation is determined by comparing the first feedback variable with a command variable. Then, a first individual controller output variable is generated from the first control deviation by means of a first controller. Furthermore, a second feedback variable is determined by means of averaging the control variable over a period of time, the actual value of the control variable being, for example, measured over the entire sampling cycle and an average value of the actual values measured in this period of time being generated, the average value being provided as the second feedback variable. Subsequently, a second control deviation is determined by comparing the second feedback variable with the command variable. A second individual controller output variable is generated from the thus generated second control deviation. Eventually, a controller output variable is generated from the sum of the two individual controller output variables, the controller output variable being used for setting the control variable so that the control variable follows the command variable. Herein, it is advantageous that by combining the two measuring methods, two different measured values of the actual value of the control variable are provided which differ considerably from each other with regard to the properties accuracy and rapidity. Whereas sampling provides very up-to-date measured values and thus allows for a rapid controlling without any additional downtime, a suppression of high-frequent disturbances and thus an exact measured value is made possible by generating an average value. By providing two different control elements with both measured values as separate feedback variables, the control behavior of each individual control element and thus of the entire controller may be optimized.

In a further embodiment of the invention, it is provided that the first individual controller output variable is generated by means of a proportional controller. Furthermore, the second individual controller output variable is to be generated from the second control deviation by means of an integral controller. Since a proportional controller is used as a first controller, this quick controller type is provided with the up-to-date first control deviation obtained by means of sampling. The second controller, however, is provided with a very accurate value of the control deviation. By using an integral controller, the accuracy of this controller type may be increased even more. The advantages of both controllers may be used by optimizing the two individual controllers. The combined controller thus comprises the advantages of both measuring methods/controller types, wherein the disadvantages of both measuring methods/individual controllers may essentially be compensated.

A further embodiment of the invention provides for the second feedback variable to be determined by an integration of the actual value of the control variable over a period of time such as a PWM-switching period. The integration allows for a particularly rapid generation of an average value which may moreover be implemented in a relatively easy way.

In a further embodiment of the invention, the control variable is set by means of a manipulated variable clocked with a switching frequency. Herein, sampling the control variable is carried out at double switching frequency. Furthermore, the average value of the control variable is generated over a period of time which corresponds to a switching period which is predetermined by the switching frequency of the manipulated variable. Both methods are suitable for minimizing such measuring errors which occur due to harmonics which result from the clocking of the manipulated variable in the control variable range. It is advantageous if sampling the control variable is carried out synchronously to the clock signal with the help of which the manipulated variable is clocked. Hereby, it is particularly easily possible to carry out the sampling at harmonic-free points in time. This in turn allows for more accurate measurements.

A further embodiment of the invention provides that clocking the manipulated variable is carried out by means of a pulse-width modulation. The pulse-width modulation is in particular suitable for setting the manipulated variable such as the motor voltage. The fixed switching frequency typically used for pulse-width modulation allows for a particularly accurate measurement of the control variable using the above-mentioned steps. Since pulse-width modulation always works with a limited number of switching states, the actuating unit and thus the individual control system may be implemented in a particularly simple and cost-efficient manner by using a pulse-width modulator.

A further embodiment of the invention provides that the control variable is controlled by means of a digital controller. This type of controller allows for a very accurate controlling and may be optimally adapted to the individual application due to its modifiability. If analog signals are digitized by means of a delta-sigma modulator, the algorithm for sampling or, respectively, integrating the control variable may be implemented in commercially available programmable logic modules in a cost-efficient way.

A further embodiment of the invention provides that the current of a load is controlled as control variable. Since the controlling accuracy is an essential property in many current-controlling applications, a suitable current-control device may be implemented in a particularly simple way by means of the invention. This is the case, for example, with current controllers for electric drives. Since especially servomotors require an exceedingly, precise current control, a particularly rapid and accurate servo control may be implemented in a particularly cost-efficient manner by means of the inventive closed-loop control device.

According to a further embodiment of the invention, a control device comprises a measuring device which determines a first feedback variable by sampling the control variable as the actual value of the control variable is respectively determined at a point in time which is predetermined by the sampling frequency and as the actual value is provided as first feedback variable. Furthermore, the measuring device determines a second feedback variable by averaging the control variable as the actual value of the control variable is determined and averaged over a period of time and as the averaged actual value is provided as second feedback variable. Furthermore, the control device comprises a comparing device having a first and a second comparing element. Each of the two comparing elements receives a respective feedback variable via a separate channel and generates a respective individual control deviation from it by comparing the feedback variable with a command variable. The control device further comprises a control unit having a first and a second controller, the first controller generating a first individual controller output variable from the first control deviation and the second controller generating a second individual controller output variable from the second control deviation. A summation device of the control device generates a common controller output variable from the two individual controller output variables, the common controller output variable using an actuator unit for setting the control variable.

A further embodiment of the invention provides that the measuring device comprises an integrating device for generating the averaged actual value by an integration of the control variable over the period of time. Generating the averaged value may be implemented in a particularly simple manner by means of an integral element.

What is claimed is:

1. A method of closed-loop controlling, comprising the steps:
    determining a first feedback variable by sampling a control variable,
    determining a second feedback variable by averaging the control variable,
    comparing the first and second feedback variables with a command variable, and
    setting the control variable on the basis of the comparing result so that the control variable follows a command variable.

2. The method of closed-loop controlling according to claim 1,
    wherein the second feedback variable is determined by an integration of an actual value of the control variable over a period of time.

3. The method of closed-loop controlling according to claim 1,
    wherein a manipulated variable clocked with a switching frequency is generated for setting the control variable.

4. The method of closed-loop controlling according to claim 3,
    wherein sampling the control variable is carried out at the double switching frequency.

5. The method of closed-loop controlling according to claim 3,
    wherein sampling the control variable takes place synchronously with a clock signal by means of which the manipulated variable is clocked.

6. The method of closed-loop controlling according to claim 3,
    wherein the average value of the control variable is generated over a period of time which corresponds to a switching period which is predetermined by any of the switching frequency of the manipulated variable and an integer multiple of this switching period.

7. The method of closed-loop controlling according to claim 3,
    wherein clocking the manipulated variable is carried out by means of a pulse-width modulation.

8. A method of closed-loop controlling, comprising the steps:
    determining a first feedback variable by sampling a control variable at a sampling rate, the actual value of the control variable being registered, respectively, at a point in time which is determined by the sampling rate, the actual value being provided as a first feedback variable,
    determining a first control deviation by comparing the first feedback variable with a command variable,
    generating a first individual controller output variable from the first control deviation by means of a first controller,
    determining a second feedback variable by averaging the control variable, the actual value of the control variable being registered over a period of time, whereby an average value is generated from the actual value, and whereby the averaged actual value is provided as a second feedback variable,
    determining a second control deviation by comparing the second feedback variable with the command variable,
    generating a second individual controller output variable from the second control deviation by means of a second controller,
    generating a controller output variable from the two individual controller output variables, and
    using the controller output variable for setting the control variable so that the control variable follows the command variable.

9. The method of closed-loop controlling according to claim 8,
    wherein the first individual controller output variable is generated from the first control deviation by means of a proportional controller.

10. The method of closed-loop controlling according to claim 8,
    wherein the controller output variable is generated by summing up the two individual controller output variables.

11. The method of closed-loop controlling according to claim 8,
    wherein in each case the sampling takes place at a harmonic-free point in time of the control variable.

12. The method of closed-loop controlling according to claim 8,
    wherein the control variable is controlled by means of a digital controller, and
    wherein analog signals are digitized by means of a delta-sigma modulator.

13. The method of closed-loop controlling according to claim 8,
    wherein as a control variable, the current of a load is controlled.

14. The method of closed-loop controlling according to claim 13,
    wherein the current of an electric motor is controlled as a control variable, and
    wherein the command variable is provided by any of a superordinated rotation-speed control loop and a feed-forward system.

15. A closed-loop controller, comprising:
    a measuring device being configured to determine a first feedback variable by sampling a control variable and a second feedback variable by averaging the control variable,
    a controller being configured to generate a controller output variable by means of a comparison of the first and second feedback variables with a command variable, and
    an actuator unit for setting the control variable by means of the controller output variable in such a way that the control variable follows the command variable.

16. The closed-loop controller according to claim 15,
    wherein the measuring device comprises an integrating device in order to generate the a second feedback variable by means of an integration of the control variable over a period of time.

17. The closed-loop controller according to claim 15,
wherein the actuator unit is configured to generate a manipulated variable which is clocked with a switching frequency from the controller output variable in order to set the control variable.

18. The closed-loop controller according to claim 17,
wherein the measuring device is configured to sample the control variable at the double switching frequency.

19. The closed-loop controller according to claim 17,
wherein the measuring device is configured to generate the average variable of the control variable over a period of time which corresponds to a switching period which is predetermined by the switching frequency of the manipulated variable or to an integer multiple of this switching period.

20. The closed-loop controller according to claim 17,
wherein the measuring device is configured to sample the control variable synchronously to a clock signal which serves the actuator unit for clocking the manipulated variable.

21. The closed-loop controller according to claim 15,
wherein the actuator unit comprises a pulse-width modulator in order to clock the manipulated variable.

22. A closed-loop controller, comprising:
a measuring device, wherein the measuring device is configured to determine a first feedback variable by sampling the control variable, the actual value of the control variable being registered each time at a point in time which is determined by the sampling frequency and the actual value of the control variable then being provided as a first feedback variable,
wherein the measuring device is further configured to determine a second feedback variable by averaging the control variable, the actual value of the control variable being determined and averaged over a period of time and the averaged actual value being provided as a second feedback variable,
a comparing device having a first and a second comparing element,
wherein the first comparing element is configured to generate a first control deviation by means of a comparison of the first feedback variable with a command variable, and
wherein the second comparing element is configured to generate a second control deviation by means of a comparison of the second feedback variable with the command variable,
a closed-loop controller having a first and a second controller,
wherein the first controller is configured to generate a first individual controller output variable from the first control deviation, and
wherein the second controller is configured to generate a second individual controller output variable from the second control deviation,
a summation device,
wherein the summation device is configured to generate a controller output variable from the two individual controller output variables, and
an actuator unit for setting the control variable by means of the controller output variable in such a way that the control variable follows the command variable.

23. The closed-loop controller according to claim 22,
wherein the first controller is a proportional controller.

24. The closed-loop controller according to claim 22,
wherein the second controller is an integral controller.

25. The closed-loop controller according to claim 22,
wherein the measuring device is configured to carry out the sampling each time at points in time of the control variable which are free of harmonics.

26. Closed-loop controller according to claim 22,
wherein the control device is configured as a digital controller.

27. Closed-loop controller according to claim 23,
wherein the measuring device comprises a delta-sigma-modulator for digitizing analog signals.

28. A current controller for a load, comprising:
a measuring device being configured to determine a first feedback variable and a second feedback variable from a control variable,
a controller being configured to generate a controller output variable by means of a comparison of the first and second feedback variables with a command variable, and
an actuator unit for setting the control variable by means of the controller output variable in such a way that the control variable follows the command variable,
wherein the current controller is part of a superordinate rotation-speed control loop, a manipulated variable of which generates the command variable of the controller alone or in combination with a feed-forward system.

29. A current controller for a load, comprising:
a measuring device being configured to determine a first feedback variable and a second feedback variable from a control variable,
a controller being configured to generate a controller output variable by means of a comparison of the first and second feedback variables with a command variable, and
an actuator unit for setting the control variable by means of the controller output variable in such a way that the control variable follows the command variable,
the current controller being configured to control the current of a three-phase motor in a stator fixed frame, and
wherein, depending on the applied stator fixed frame, two or three measuring devices and two or three control devices are provided in order to register and control individual current components of the respective stator fixed frame independently from one another.

30. A current controller for a load, comprising:
a measuring device being configured to determine a first feedback variable and a second feedback variable from a control variable,
a controller being configured to generate a controller output variable by means of a comparison of the first and second feedback variables with a command variable, and
an actuator unit for setting the control variable by means of the controller output variable in such a way that the control variable follows the command variable,
the current controller being configured to control the current of a three-phase motor in a field-oriented coordinate system, and
wherein for each current component of the field-oriented coordinate system, a respective control device is provided, and
wherein two or three measuring devices are provided in order to register the two current components of the field-oriented coordinate system or, respectively, all the three current components of the three-phase motor independently from each other.

* * * * *